United States Patent [19]

Germanowski et al.

[11] 4,042,938
[45] Aug. 16, 1977

[54] ANALOG AND DIGITAL DATA RECORDER

[75] Inventors: Frank Germanowski; John A. Kazura, both of Pittsfield, Mass.

[73] Assignee: The United States of America as represented by the Secretary of the Army, Washington, D.C.

[21] Appl. No.: 647,386

[22] Filed: Jan. 8, 1976

[51] Int. Cl.² .............................................. G01D 9/30
[52] U.S. Cl. ...................................... 346/61; 346/141
[58] Field of Search ..................... 346/49, 50, 61, 66, 346/141, 94, 98

[56] References Cited
U.S. PATENT DOCUMENTS

| | | | |
|---|---|---|---|
| 2,544,919 | 3/1951 | Dueringer | 346/66 X |
| 2,587,079 | 2/1952 | Woods et al. | 346/66 |
| 2,611,802 | 9/1952 | Jensen | 346/61 X |
| 3,388,404 | 6/1968 | Bush | 346/61 X |
| 3,631,506 | 12/1971 | Nielsen | 346/98 X |
| 3,754,279 | 8/1973 | Valenti et al. | 346/61 X |
| 3,757,350 | 9/1973 | Fliegner et al. | 346/50 |

Primary Examiner—Joseph W. Hartary
Attorney, Agent, or Firm—Nathan Edelberg; Robert P. Gibson; Saul Elbaum

[57] ABSTRACT

A data recorder for recording and simultaneously printing both analog and digital data on the same strip chart. The simultaneous recording of both the analog and digital data provides a permanent time base correlation of the event(s) represented thereby which is extremely useful for instant analysis of later study. In a preferred embodiment, two channels of analog information are recorded by pen styli and are representative of the output of a pair of condensation nuclei counters for monitoring atmospheric pollution. The digital data is recorded simultaneously adjacent the analog information in its own channel and represents position coordinates corresponding to the location of the airborne counters at any given point in time and may, for example, comprise the digital output of a LORAN-C navigator. The simultaneous output allows immediate correlation between the maxima and minima of the analog traces and position.

21 Claims, 5 Drawing Figures

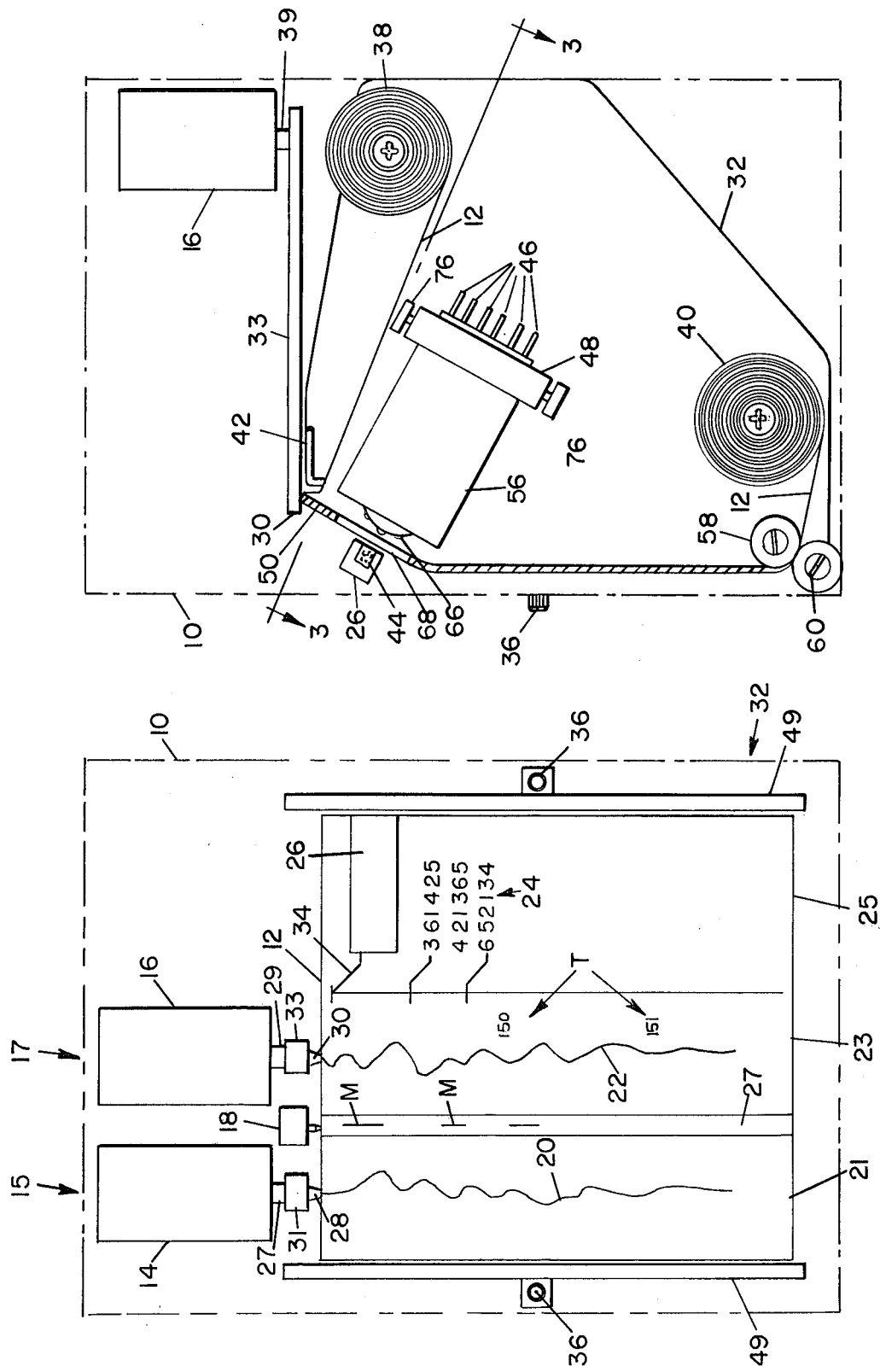

ANALOG AND DIGITAL DATA RECORDER

RIGHTS OF THE GOVERNMENT

The invention described herein may be manufactured, used, and licensed by or for the United States Government for governmental purposes without the payment to us of any royalty thereon.

BACKGROUND OF THE INVENTION

1. Field of the Invention

The present invention is related to data recorders and printers and, more particularly, is directed towards a data recorder for recording and printing both digital and analog data simultaneously on a common strip chart.

2. Description of the Prior Art

Airborne detection systems utilize many different types of special sensing equipment for monitoring, detecting, and recording various data.

Typical of such airborne sensors and detecting equipment is a unit known as a condensation nuclei counter which basically provides a particle monitoring function for detecting, for example, atmospheric pollution or personnel activity on the ground. Such condensation nuclei counters, whose principles of operation are well-known and therefore need not be set forth herein in detail, generally provide an output analog voltage in direct proportion to the sensed activity level.

When equipment such as the above-described condensation nuclei counters are utilized in an airborne detection unit, it becomes important to be able to correlate the analog output voltage from the counters with the position of the aircraft at any given time. In this manner, maximum and minimum analog readings output by the sensors may be pinpointed to precise locations on the ground. This becomes particularly important in connection with personnel detection sensors since, in warfare, effective retaliatory action must be swift and accurate.

Such position information is digitally output from the aircraft's navigation computer, which may, for example, comprise a LORAN-C navigation unit, and, as noted above, must be time-coordinated with the analog readings from the condensation nuclei counters.

The technique previously utilized to time correlate such data was primarily manual in nature and therefore lead to much error and was generally quite time consuming. It consisted simply of the operator of the equipment visually noting the occurrence of, for example, a maximum voltage reading on a meter connected to the condensation nuclei counters' output, and then manually recording from another remote output the navigation unit digital output reading at that particular moment in time. These two pieces of data had to then be further manually reduced in order to transform the navigator computer output into a meaningful reading for retaliatory strikes. The importance of swift and accurate analog and digital data correlation and reduction is magnified when considered in connection with fast-changing warfare requirements and the generally swift mobility of the enemy.

A non-manual time-coordination alternative reduces to a requirement for a recorder which enables the simultaneous real time recording of both analog and digital data in the same unit. However, it was found that such a recorder was not available commercially.

A not insignificant factor taken into account in the search for a suitable recording device was the extremely limited space within existing surveillance aircraft such as helicopters. A suitable recorder, therefore, had to be designed so as to occupy a minimum amount of space so as to be compatible with and easily installed within existing surveillance aircraft.

OBJECTS AND SUMMARY OF THE INVENTION

It is therefore a primary object of the present invention to provide an analog and digital data recorder which allows simultaneous recording of both analog and digital data continuously in real time on a common recording medium to allow immediate data correlation.

Another object of the present invention is to provide an analog and digital data recorder which overcomes all of the disadvantages set forth above with respect to prior art recorders and techniques.

A still further object of the present invention is to provide an analog and digital data recorder which is compact, utilizes many standard components, and which can be mounted and accommodated within the limited space availability of existing aircraft.

An additional object of the present invention is to provide an analog and digital data recorder which may be utilized to simultaneously record a pair of analog data signals from a pair of airborne condensation nuclei counters and have immediately recorded theretonext the digital output from a navigation unit represenatative of the position coordinates of the aircraft.

A still further object of the present invention is to provide an analog and digital data recorder which is lightweight and portable and is capable of recording at least two channels of analog data and one channel of six-bit digital data on a common roll of chart paper.

A still further object of the present invention is to provide an analog and digital data recorder which records and prints both digital and analog output signals with a single instrument to eliminate the need to interpolate data between two independently recorded pieces of information.

Another object of the present invention is to provide a data recording device wherein the number of analog and digital channels of information may be varied, the digital information may be printed as numbers, characters, letters, or the like, which accepts any input digital signal format, and provides a variable digital print-out rate.

The foregoing and other objects are attained in accordance with one aspect of the present invention through the provision of a data recording device which comprises a housing, strip chart paper movably positioned within the housing and having at least two channels for recording data information. Means are also provided within the housing for printing analog data on one of the channels and means for simultaneously printing digital data on the other channel. The strip chart paper is transported past the adjacently mounted means for printing analog and digital data against a chart paper platen. The platen includes an aperture formed therein adjacent the location of the digital data recording means in order to allow same to strike a fixed inked platen mounted on the other side of the aperture.

In accordance with another aspect of the present invention, the analog data printing means comprises a stylus for continuously tracing the analog data onto the first channel of the strip chart paper, and a pen motor for controlling the position of the stylus in response to the analog data being monitored. Two or more analog data channels may be provided, with a separate stylus and pen motor for each channel.

In accordance with still other aspects of the present invention, the digital data printing means comprises a plurality of printing modules adjacently arranged within the housing, the number of said modules equal to the number of digital channels of information desired to be printed. Each of the printing modules has a rotatable printing wheel mounted and protruding from one end thereof. The printing wheels each have a plurality of digital indicia, such as the digits from "0" to "9", positioned thereon. Control means are provided for each module to selectively position its associated printing wheel for the desired output. In a preferred embodiment, the control means comprises means responsive to a serial train of electrical input pulses for stepping the printing wheel in proportion to the number of pulses received. Further, the control means are responsive to a reset pulse for resetting the printing wheels to their initial positions.

In accordance with still other aspects of the present invention, the digital data printing means also includes a print control solenoid which is responsive to a print command signal to move a longitudinally mounted spring-biased arm in response thereto. Connected to the free end of the solenoid arm is a pivotally mounted and transversely disposed yoke whose other end is pivotally mounted to the printing module retaining means. Intermediate the solenoid and printing modules, the yoke is further pivotally mounted to a fixed pivot. The solenoid arm pivot point has an oval slot for actuating the yoke impulsively in response to the actuation of the solenoid. Actuation of the yoke, in turn, causes same to pivot about its intermediate fixed pivot and, in turn, impulses the printing modules so as to impress the latter through the aperture in the chart paper platen against the fixed ink platen so as to transfer the digital information onto the chart paper. A counterweight is preferably positioned at one end of the yoke for counterbalance purposes.

In a preferred embodiment, two channels of analog information are representative of the output of a pair of condensation nuclei counters, while the six-bit digital data comprises position and location information received from a navigation unit computer, such as a LORAN-C navigator.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a plan view schematically illustrating a preferred embodiment of the digital and analog data recording device of the present invention;

FIG. 2 is a side view of the preferred embodiment illustrated in FIG. 1;

DETAILED DESCRIPTION OF THE PREFERRED EMBODIMENT

Figure 4:
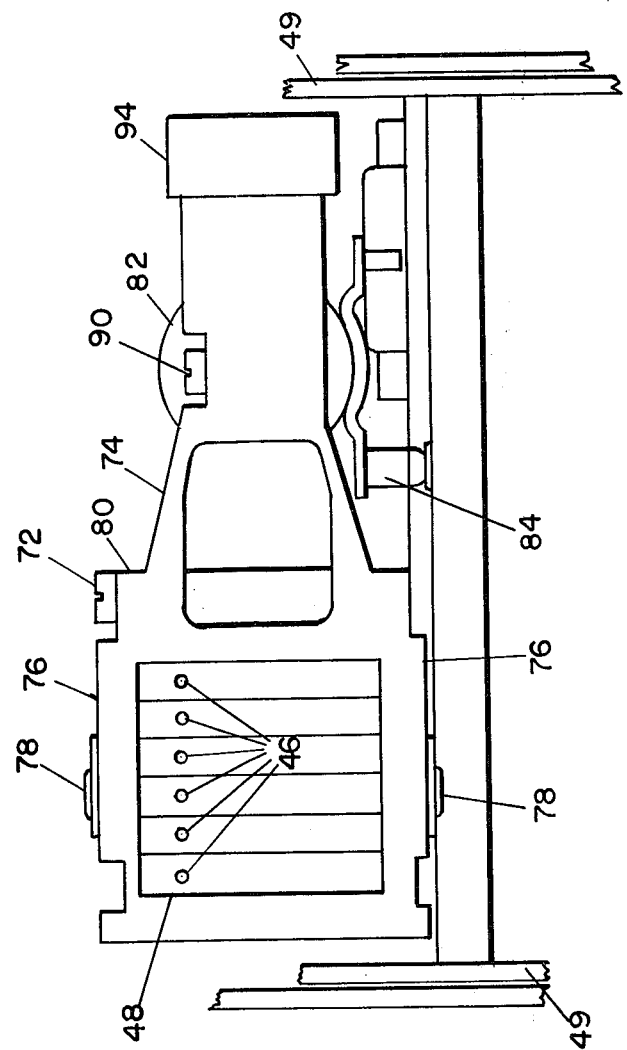
FIG. 4 is another view of the digital data printing means of the preferred embodiment of the present invention and taken along line 4—4 of FIG. 3.

Referring now to the drawings, wherein like reference numerals designate identical or corresponding parts throughout the several views, and more particularly to FIG. 1 thereof, there is illustrated in a plan view a schematic representation of the main elements which comprise the digital and analog data recorder of the present invention wherein reference numeral 10 designates generally the housing or chassis of the recorder.

The unique character of the recorder/printer of the present invention is perhaps best illustrated by the unique paper tape or strip chart paper 12 specially designed for the particular preferred embodiment hereinafter described. Chart paper 12 includes three basic data recording channels 21, 23 and 25.

Channels 21 and 23 have recorded therein a pair of analog traces 20 and 22, while channel 25 has recorded therein some digital data 24.

The analog traces 20 and 22 are formed on chart paper 12 by means of a pair of analog data recording means indicated generally by the reference numerals 15 and 17. Analog data recording means 15 includes a pen motor 14 having a motor shaft 27 to which is attached a connecting arm 31. Downwardly extending from connecting arm 31 is a stylus 28 whose lateral movement is controlled by pen motor 14 in response to the analog data being monitored thereby.

The other analog trace 22 is recorded by means of analog data recording means 17 which also comprises a pen motor 16, a motor shaft 29 extending downwardly therefrom, a horizontally extending connecting arm 33, and a stylus 30. Pen motor 16, as is well known, responds to an analog input voltage to laterally move stylus 30 back and forth within analog recording channel 23 so as to record trace 22 appearing therein.

Chart paper 12 of the present invention is also preferably provided with an intermediate channel 27 positioned between analog recording channels 21 and 23. Intermediate channel 27 is provided for recording "event markers" M under the control of a manual pushbutton like event marker 18. Event marker 18 is preferably positioned on the outside of housing 10 and simply acts to provide a mark M at any time within intermediate channel 27 so as to enable a notation on chart paper 12 of a particular event which would not otherwise be recorded.

Chart paper 12 may also be provided with pre-printed elapsed time indicia T which, if the chart paper is being transported at a constant speed, provides a readily visible indication of the amount of paper left in a particular roll.

Digital recording channel 25 is shown with three lines of six-bit digital output information 24. This information is imprinted by means of an inked platen 44 (FIG. 2) which is held in place by a platen holder 26. Due to the displaced relative horizontal positions of the analog information recording tips 28 and 30 and the digital platen holder 26, correlation markers 34 are provided on paper 12 such that the individual lines of digital data 24 may be readily correlated in time with the corresponding analog traces 20 and 22. As exemplararily illustrated in FIG. 1, the lower line of digital data is seen to correspond to a maximum (or minimum) point in traces 20 and 22, thereby providing an instantaneous and accurate readout. If the digital data 24 is representative of, for example, position coordinates in a military UTM (Universal Transverse Mercator) map coordinate system, and traces 20 and 22 are representative of the output analog voltage traces of a pair of condensation nuclei counters, which basically serve to monitor surrounding activity levels, the precise position of maximum activity may be readily ascertained by virtue of the simultaneous and adjacent printing of the analog and digital information.

The utility of the instant invention being apparent, hereinafter the structure and operation thereof will be described in more detail with reference to FIGS. 2 through 4.

Referring now to FIG. 2, a side view of the recorder of FIG. 1 is shown which illustrates in somewhat more detail the analog and digital data printing means. The analog data printing means 17 includes the pen motor 16 which has its shaft 29 extending downwardly therefrom to control laterally extending arm 33 and hence stylus 30. The analog printing channels of the unit may preferably comprise heated styli 28 and 30 which traces in black on heat-sensitive chart paper 12, although it should be understood that they may consist of any type of tracing device, such as inked pens on heat or pressure sensitive paper, or the like.

The chart transport assembly is indicated generally by the reference numeral 32 and includes a supply roll 38 about which an ample supply of the chart paper 12 is wound. Paper 12 is threaded under a paper tensioner 42, along a fixed chart paper platen 50, and through a drive roller 58 and pinch roller 60 assembly to a take-up roll 40.

Paper platen 50 includes an aperture or opening 68 formed therein to allow the digital data printing modules, to be explained in more detail hereinafter, to pass therethrough.

Figure 3:
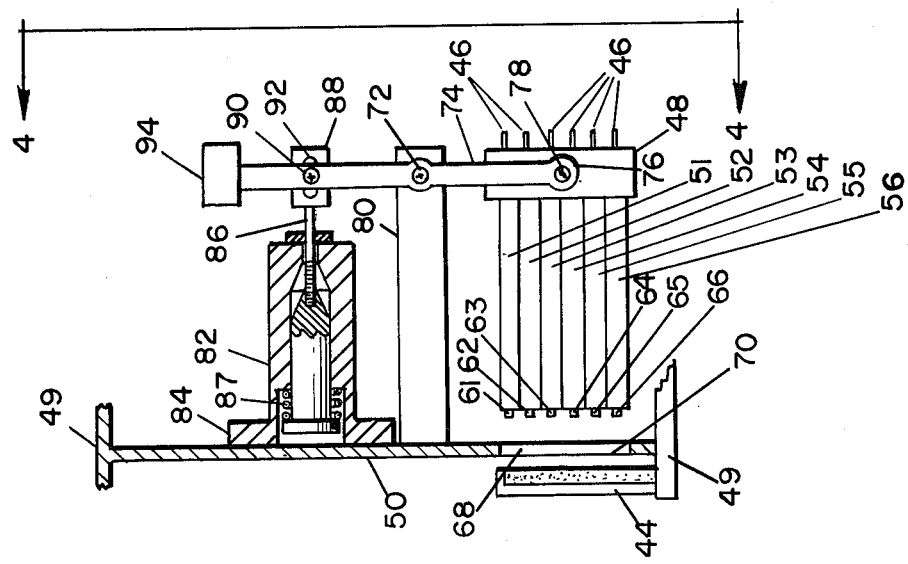
FIG. 3 is a schematic view illustrating the preferred configuration of the digital data recording means of the preferred embodiment of the present invention and taken along line 3—3 of FIG. 2.

Illustrated in FIG. 2 is a printing module 56 which is mounted in a module restraint collar to retainer 48 in which is also mounted, for example, five other printing modules 51 through 55, inclusive (see FIG. 3).

Printing module 56, which may comprise a standard print module No. MMP-6 as manufactured by Practical Automation, includes a rotatable print wheel 66 mounted at and extending from one end thereof. The six adjacent print wheels in the preferred mode are intended to pass through opening 68 in platen 50 for striking inked platen 44 mounted within holder 26. Extending from the rear of module restraint collar 48 are a plurality of module connectors 46 for connection to the control circuitry (not shown).

Paper tensioner 42 tensions the chart paper 12 in a sharp "S" curve to prevent the print modules from pulling slack into the chart paper 12 when actuated, which otherwise causes erratic timing and spurious signal traces.

Referring now to FIG. 3, a top view of the digital data printing means taken along line 3—3 of FIG. 2 is illustrated. The printing modules 51 through 56 are seen to be adjacently mounted within the modules restraint collar 48. The individual print wheels 61 through 66 for modules 51 through 56, respectively, are shown extending from the respective ends thereof. Also shown in more detail is the chart platen 50 having the opening 68 strategically positioned therein for allowing print wheels 61 through 66 access therethrough to inked platen 44. Chart transport platen 50 is seen to be securely mounted within the assembly side supports 49, as is inked platen 44.

Each of the printing modules 51 through 56 contains control means for controlling the rotation of its associated print wheels 61 through 66. Print wheels 61 through 66 are multi-faceted and contain raised indicia on the externally facing surfaces thereof. For example, a print wheel may contain the numerals 0 through 9 on the nine faces thereof which are selectively positionable adjacent the opening 68 in platen 50. The control means within each of the printing modules act to rotatably position the respective print wheels, in a well-known manner, to select the desired indicia for eventual imprinting upon paper 12. In a preferred embodiment, each of the print wheels are rotatably activated by an externally provided serial pulse train which serves to step the wheels a number of times equal to the number of pulses in the train. After printing, a reset pulse is provided to reset the print wheels 61 through 66 to their initial or zero position. This will be described in more detail hereinafter in connection with FIG. 5.

After the individual print wheels 61 through 66 have been properly positioned by their respective control means and pulse trains, a "PRINT COMMAND" signal is sent to the actuating solenoid 82. Solenoid 82, which may comprise, for example, a modified number 174419-026, manufactured by LEDEX, Inc., is a push-type solenoid having an elongated solenoid arm 86 extending from one end thereof. One end of arm 86 is biased to the left (as viewed in FIG. 3) by means of a spring 87. The distal end of arm 86 is connected to a slider 88 that has an oval slot 92 formed therein.

Extending through oval slot 92 is a pivot pin 90 of a transversely extending actuator yoke 74. Attached to one end of yoke 74 is a counterweight 94 which serves to provide a fine timing adjustment. The distal end of yoke 74 is pivotally connected by trunions 76 to the module restraint collar 48 of the printing modules 51 through 56. Intermediate the pivots 78 and 90 is positioned an actuator pivot 72 which is fixed to a pivot arm 80 mounted on, for example, platen 50. Pivot arm 80 serves as the main support for the entire yoke assembly 74 which rotates about pivot 72.

The construction of the digital data printing means illustrated in FIG. 3 is shown from a different view, taken along line 4—4 of FIG. 3, in FIG. 4. Here, the unique construction of actuator yoke 74 is illustrated, as are pivot points 90, 72, and 78. The transverse orientation of yoke 74 with respect to solenoid 82 and printing modules 51 through 56 provides a very compact unit ideal for the space limitations inherent in, for example, the rotary winged aircraft in which such a unit is needed.

In operation, referring back to FIG. 3, when a PRINT COMMAND signal is received by solenoid 82, the same is actuated to move arm 86 thereof to the right (as viewed in FIG. 3). When the leftmost portion of oval slot 92 contacts pivot pin 90 of yoke 74, the latter is moved clockwise about pivot 72 so as to, in turn, impulsively actuate collar 48 and therefore printing modules 51 through 56 to move to the left.

The desired indicia of print wheels 61 through 66 have been selected by the previously supplied serial pulse trains thereinto, and the selected indicia will therefore be applied against the portion 70 of chart paper 12 that overlaps aperture 68 of platen 50. The solenoid 82 is provided with a pulse of long enough duration, such as 45 milliseconds, to carry the print modules 51 through 56 to the back of the recording paper 70. Thereafter, with the solenoid power removed, the printing modules slap the paper 70 against the inked platen 44 on the front of the paper for printing the selected six-digit number. Thereafter, the return spring 87 of solenoid 82 in conjunction with the rightmost portion of oval slot 92 acts to impulsively rotate actuator yoke 74 counterclockwise about pivot point 72 to return the module restraint collar 48, and hence printing modules 51 through 56, to their original unactuated position.

Figure 5:
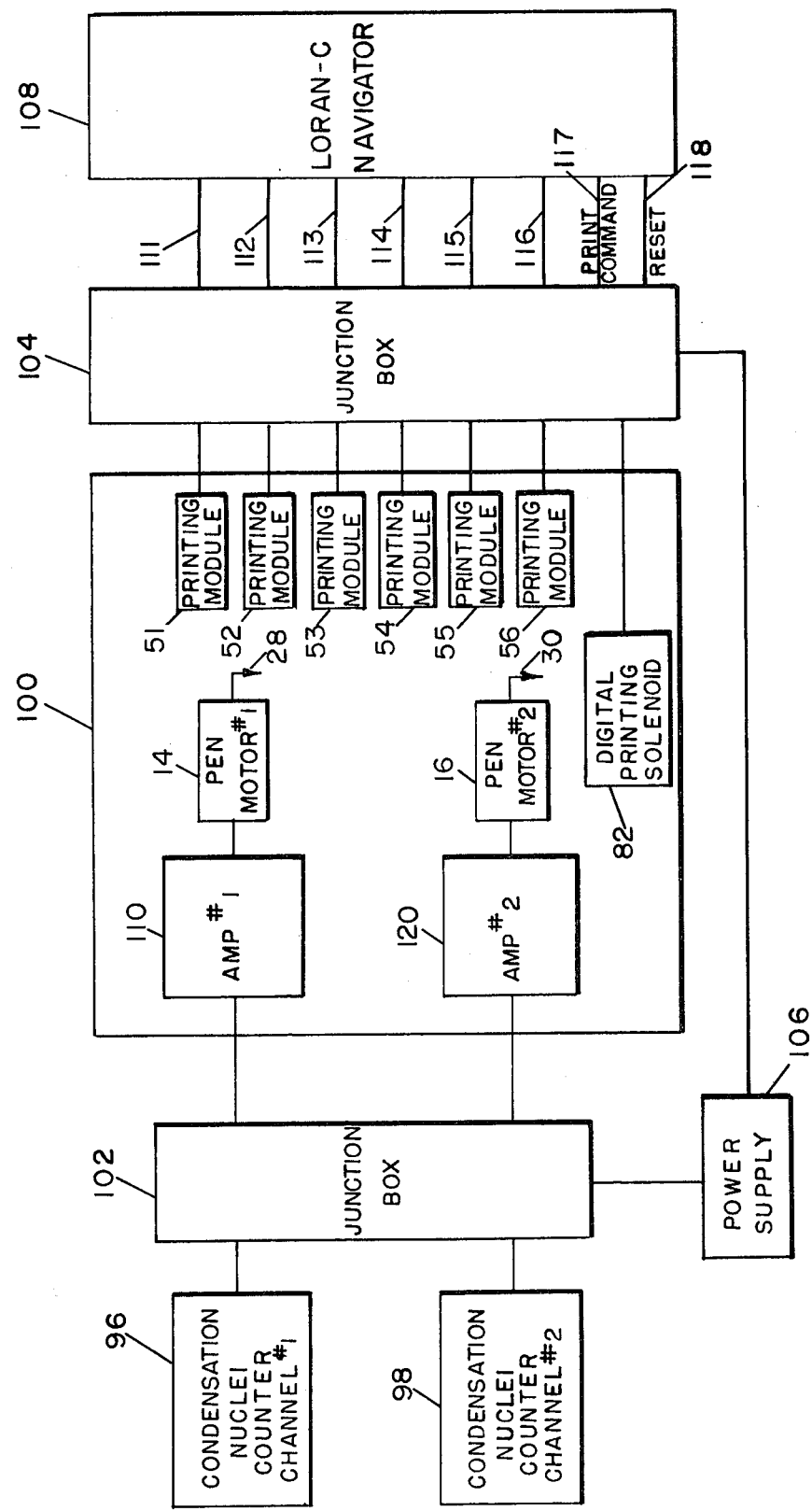
FIG. 5 is a functional block diagram illustrating a preferred embodiment of the electrical component interconnections of the data recorder of the present invention.

Referring now to FIG. 5, a functional block diagram of the preferred components comprising the recorder of the present invention is illustrated. The recorder/printer is indicated generally by the reference numeral 100 and is seen to include the two pen motors 14 and 16 as well as their associated styli 28 and 30, schematically illustrated. Also contained within recorder 100 are the six printing modules 51 through 56 and the digital printing solenoid 82.

The control signals are received by pen motors 14 and 16 via a pair of amplifiers 110 and 120, respectively.

Feeding amplifiers 110 and 120 via a junction box 102 are the output analog voltages from a pair of condensation nuclei counters 96 and 98. As explained hereinabove, such condensation nuclei counters when airborne monitor the activity level on the ground, and the simultaneous recording of the analog information along with digital navigation information comprises a primary feature of the present invention.

The aforedescribed digital navigation information may be provided, for example, by a LORAN-C navigator 108. In this particular embodiment, the outputs 111 through 118, inclusive, from the LORAN-C navigator 108 are fed to printing modules 51 through 56 and digital printing solenoid 82 via a junction box 104. The interface or junction boxes 102 and 104, which may be housed in the same unit, serve to couple the signal and power lines provided by power supply 106 between the condensation nuclei counters 96 and 98, the LORAN-C navigator 108 output, and the recorder/printer 100.

The preferred configuration adopted in the illustrated embodiment of the present invention feeds serial pulse train signals output from navigator 108 for directly controlling the stepping of the print wheels of printing modules 51 through 56 to the desired positions. The data input code, therefore, comprises one serial pulse train per digit, with the number of pulses equal to the digit count. In a preferred embodiment, the maximum pulse rate is 40 Hertz, while a minimum of 10 pulses are required along line 118 to constitute a RESET pulse for resetting the print wheels of printing modules 51 through 56 to zero. The PRINT COMMAND signal sent along line 117 to digital printing solenoid 82 preferably comprises a single pulse of an 80 millisecond minimum duration and serves, in turn, to actuate solenoid 82.

The particular system illustrated in FIG. 5 eliminates the need for additional electronics, such as serial-to-parallel converters, or the like, which may be required in other more complex printers, and accomplishes six-digit digital data transfer and control with only nine interface wires 111 through 118 (plus a return wire) and therefore is highly economical. It should be understood, however, that different outputs from different navigators may be accommodated simply by adding suitable electronics to transform the output code thereof into a usable printer command signal. Obviously, different printing modules may also be accommodated within a general design scheme to serve a particular function.

It is seen therefore that we have provided a unique recorder/printer of both digital and analog information which prints out a permanent record of analog and digital data on the same paper chart with a common time base. It should be understood that the analog and digital information may comprise the same information (for redundancy and checking purposes), related information, or independent information, as exemplified by the above-described example, with time correlation. While the device of the present invention was orginally designed for use in fixed and rotary winged aircraft, a variety of applications may be envisioned wherein it is necessary to simultaneously record in the same time frame both analog and digital information. Such applications and environments include process control, mineral and oil surveying, medical monitoring, oceanography and anti-submarine warfare, pollution control, nuclear power plant instrumentation, and the like.

Obviously, numerous variations and modifications of the present invention are possible in light of the above teachings. For example, the number of analog and digital channels of information may be varied, and the digital information may be printed as numerals, characters, letters, or any other desired mark. Further, the type and number of characters may be varied by utilizing different print wheels. The device of the present invention may accept any input digital signal format with the addition of appropriate electronic converters. Furthermore, the digital printout rate may be varied and increased to a maximum rate limited by the printing of one character immediately adjacent another, which rate may be further increased if the chart speed is increased. The strip chart correlation marks match the analog and digital events in time, and it is obvious that other informational features may be incorporated onto the strip chart paper to assist speedy data reduction.

Accordingly, we do not desire to be limted to the exact details of construction shown and described, for obvious modifications will occur to a person skilled in the art.

We claim as our invention:

1. A data recording device, which comprises:

a housing which includes a chart paper platen adjacent on which said strip chart paper is movable positioned by said transporting means;

strip chart paper movable positioned within said housing and having at least two channels for recording data information;

a data sensing means for detecting analog data signals;

a second data sensing means for detecting discrete navigational information signals and producing digital data representative thereof;

means responsive to said analog sensing means for printing said analog data on one of said channels of said strip chart paper;

means responsive to said digital sensing means for simultaneously printing said digital data on another of said channels of said strip chart paper, wherein said means for printing digital data comprises a plurality of printing modules adjacently arranged within said housing, each of said modules having a printing wheel associated therewith, each of said printing wheels having a plurality of digital indicia positioned thereon and rotatably mounted in one end of their respective printing modules, and a control means responsive to a serial train of electrical input pulses for stepping said printing wheel in proportion thereto and for continuously processing said digital data wherein said control means further comprises print control means responsive to an electrical print command signal for actuating said plurality of printing modules and includes means responsive to a reset pulse for resetting said printing wheels to an initial position, and also wherein said chart paper platen has an aperture formed therein adjacent the location of said digital data recording means; and means for transporting said strip chart paper past said means for printing analog data and said means for printing digital data, wherein swift and accurate simultaneous digital and analog data correlation is obtained.

2. The data recording device as set forth in claim 1, wherein said two channels of said strip chart paper are positioned adjacent one another.

3. The data recording device as set forth in claim 2, wherein said means for printing analog data is positioned adjacent said means for printing digital data.

4. The data recording device as set forth in claim 3, wherein said means for printing analog data comprises stylus means for continuously tracing said analog data onto said first channel and means for controlling the position of said stylus means in response to the analog data being monitored.

5. The data recording device as set forth in claim 1, wherein each of said printing wheels of said plurality of printing modules are positioned adjacent and extending from one end thereof, the other ends thereof being fixably mounted in a module retaining means.

6. The data recording device as set forth in claim 5, wherein said print control means comprises a solenoid means for actuably receiving said electrical print command signal, and means connecting said solenoid means and said module retaining means for transmitting motion of said solenoid means to said printing modules.

7. The data recording device as set forth in claim 6, wherein said solenoid means is mounted at its base to said chart paper platen and includes an elongate arm which moves in a first direction in response to the electrical actuation of said solenoid means, spring means for urging said arm to move in a second direction diametrically opposed to said first direction, and means pivotally connecting one end of said arm to an end of said connecting means.

8. The data recording device as set forth in claim 7, wherein said pivotal connecting means comprises an oval slot for receiving a pivot pin mounted to said end of said connecting means.

9. The data recording device as set forth in claim 8, wherein said connecting means comprises a yoke having first, second and third pivot points, said first pivot point corresponding to said pivot pin at said end of said yoke.

10. The data recording device as set forth in claim 9, wherein said second pivot point comprises a pivotal connection of the distal end of said yoke to said module retaining means.

11. The data recording device as set forth in claim 10, wherein said third pivot point comprises a fixed pivot positioned intermediate said first and second pivots.

12. The data recording device as set forth in claim 11, wherein said yoke further includes counterweight means located at said end for balancing the movement thereof.

13. The data recording device as set forth in claim 12, wherein the movement of said yoke is positioned in response to the actuation of said solenoid means is substantially transverse to the movement of said arm of said solenoid means and to the movement of said printing modules.

14. The data recording device as set forth in claim 5, wherein said module retaining means includes a plurality of electrical connectors extending therefrom for transmitting electrical signals to said printing modules.

15. The data recording device as set forth in claim 1, wherein said means for printing digital data comprises a plurality of printing modules adjacently arranged within said housing, each of said modules having a printing wheel associated therewith.

16. The data recording device as set forth in claim 15, further comprising an inked platen fixably mounted adjacent said aperture and opposite said print wheels of said printing modules, said chart paper being disposed between said aperture and said inked platen.

17. The data recording device as set forth in claim 16, wherein said means for printing digital data further comprises print control means responsive to an electrical print command signal for actuating said plurality of printing modules so as to move said print wheels into pressure contact with said inked platen.

18. The data recording device as set forth in claim 17, wherein said housing further comprises tensioning means positioned at the upper side of said chart paper platen for urging said chart paper downwardly prior to its passage over said aperture.

19. The data recording device as set forth in claim 18, wherein said device further comprises a third channel on said chart paper for recording analog data information.

20. The data recording device as set forth in claim 19, wherein said analog data comprises information received from a pair of condensation nuclei counters.

21. The data recording device as set forth in claim 20, wherein said digital data comprises position information received from a navigator device.

* * * * *